United States Patent
Waterhouse et al.

[11] Patent Number: 5,831,663
[45] Date of Patent: Nov. 3, 1998

[54] ADDRESSABLE TELEVISIONS FOR HOSPITALS AND HOTELS

[76] Inventors: John Waterhouse, 3533 N. Buffalo Rd., Orchard Park, N.Y. 14127; Garvy Mayo, 160 Timon St., Buffalo, N.Y. 14208

[21] Appl. No.: 672,272

[22] Filed: Jun. 26, 1996

[51] Int. Cl.[6] .................................................. H04N 7/10
[52] U.S. Cl. .................................. 348/8; 348/5.5; 348/10
[58] Field of Search .............................. 348/8, 10, 6, 5.5, 348/552, 553, 725; 455/3.1, 6.1, 3.2, 6.2

[56] References Cited

U.S. PATENT DOCUMENTS

| | | | |
|---|---|---|---|
| 4,885,803 | 12/1989 | Hermann | 455/603 |
| 4,926,264 | 5/1990 | Ohno | 358/349 |
| 5,065,235 | 11/1991 | Iijima | 358/86 |
| 5,355,162 | 10/1994 | Yazolino et al. | 348/8 |
| 5,459,507 | 10/1995 | Sakuma et al. | 348/10 |
| 5,523,781 | 6/1996 | Brusaw | 348/10 |
| 5,565,908 | 10/1996 | Ahmad | 348/8 |

*Primary Examiner*—Victor R. Kostak
*Attorney, Agent, or Firm*—Simpson & Simpson

[57] ABSTRACT

An apparatus for controlling a plurality of television sets in a cable distribution network, wherein each of the plurality of television sets contains an internal mechanism for controlling channel access to the television set, comprising a plurality of television addressable units, where each of the units controls a single television set, and each of the television addressable units has a demodulator and a microprocessor and associated memory operatively arranged to control the internal mechanism of said television set; a radio frequency transmitter operatively arranged to transmit a modulated radio frequency signal across the cable distribution network; and, a central processing unit operatively arranged to communicate with the plurality of television addressable units by generating control codes which are carried throughout the cable distribution network by the modulated radio frequency signal, wherein the control codes contain addressability information which enables the television addressable units to control the internal mechanisms of the television sets, and wherein the demodulator is operatively arranged to demodulate the modulated radio frequency signal, wherein all communications within the apparatus travel from the central processing unit to the plurality of television addressable units in one direction only.

1 Claim, 4 Drawing Sheets

ADDRESSABLE TELEVISIONS FOR HOSPITALS AND HOTELS

FIELD OF THE INVENTION

This invention relates generally to an apparatus for addressing televisions and, more particularly, to addressing televisions in hospitals, hotels, and similar institutions. Even more particularly, the invention relates to addressing televisions in a rental tier.

BACKGROUND OF THE INVENTION

Hospitals and hotels often charge their patients and guests, respectively, for television rental and service. Since patients and guests come and go, it is difficult to track the television rental fees associated with the ever-changing occupants of the rooms in the institutions.

An early attempt to solve this problem involved equipping television sets in individual rooms with an on/off key switch. The problem with this system is that it required an attendant on-duty at all times to turn individual sets on and off, and to monitor the system in general. In large institutions (with a large number of guests or patients) it was often difficult for the attendant to provide prompt service, and patients and guests often experienced excessive wait periods for service, or sometimes didn't receive the requested service at all. Another problem with this early "solution" was that the attendant often times had to reach to an inconvenient location in the room to activate the set.

An improvement over this method was the introduction of "infrared remote controls" for television sets by several manufacturers. These controls included functions such as "Free", "Pay 1", "Pay 2", and "Off", for example. Although this method was an improvement, an attendant was still required to travel from room to room to operate the remote control.

In time, other methods evolved for solving the problem of offering pay television service to individual room occupants on demand. These early methods were called "cable addressable systems" because they used a cable control system to individually link and communicate with the individual sets. These systems included both one-way and two-way cable communication links using various frequencies (including sub-bands) to achieve the link between devices. Frequency shift keying was one method used to communicate information between components.

Eventually, several manufacturers developed set top boxes that were placed or otherwise secured to the television set. Although technically effective, this method proved to be expensive. The more programming options incorporated in the set-top box, the more expensive the unit cost. Another problem associated with set top addressability is that the television channels had to be encrypted to prevent unauthorized reception. Encryption, of course, also increased the cost of the system. Set top box systems also required the design and manufacture of specific remote hand units matched to the set top box.

Another television addressing system has recently been developed by Electroline Inc. of Canada. This method uses addressable taps and cable lines. The taps or ports are coded and are addressed from a central processing unit (CPU). This system uses band pass filter technology to tier the service to the end users. Although this system is less expensive in general than set top systems, it does incorporate additional expense for additional components and for the installation and/or retrofit of cable to provide addressable ports, which installation also inconveniences the establishment. Additional expense is also incurred in reconfiguring the television headend system for the desired cable frequency tier bands. The addressable taps are usually installed in the ceiling. Removal of ceiling tiles, etc. in a hospital environment, creates environmental problems. Hospitals, in particular, are very concerned about dust and other contaminants in the air in hospital rooms.

What is needed, then, is an addressable television system for hospitals, hotels and the like that is inexpensive, convenient and user friendly, and may be installed and/or retrofitted in existing institutions with little or no modification of the existing system.

SUMMARY OF THE INVENTION

The present invention broadly comprises an apparatus for controlling a plurality of television sets in a cable distribution network, wherein each of the plurality of television sets contains an internal mechanism for controlling channel access to the television set, comprising a plurality of television addressable units, where each of the units controls a single television set, and each of the television addressable units has a demodulator and a microprocessor and associated memory operatively arranged to control the internal mechanism of said television set; a radio frequency transmitter operatively arranged to transmit a modulated radio frequency signal across the cable distribution network; and, a central processing unit operatively arranged to communicate with the plurality of television addressable units by generating control codes which are carried throughout the cable distribution network by the modulated radio frequency signal, wherein the control codes contain addressability information which enables the television addressable units to control the internal mechanisms of the television sets, and wherein the demodulator is operatively arranged to demodulate the modulated radio frequency signal, wherein all communications within the apparatus travel from the central processing unit to the plurality of television addressable units in one direction only.

A primary object of the present invention is to provide an addressable television system which is can be inexpensively installed and is also inexpensive to operate.

A secondary object of the invention is to provide an addressable television system which is convenient and user friendly to operate.

Another object of the invention is to provide an addressable television system which is easy to install.

Still another object of the invention is to provide an addressable television system which will not disturb the environment when installed.

A further object of the invention is to provide an addressable television system which can be self-contained within a television set.

Still a further object of the invention is to provide a system having a CPU which controls the operation of all units in the system and also tracks billing for each unit in the system.

Yet another object of the invention is to permit addressability of older television sets as well as newer sets.

These and other objects, features and advantages of the present invention will become readily apparent to those having ordinary skill in the art upon a reading of the following specification, claims and appended drawings.

DETAILED DESCRIPTION OF THE PREFERRED EMBODIMENT

It should be understood at the outset that identical reference numbers on the various drawing sheets refer to identical elements of the invention. It should also be understood that the following description describes a preferred embodiment of the present invention and that changes, modifications and improvements in the preferred embodiment should be readily apparent to those having ordinary skill in the art. The following description is intended to completely describe the invention and to explain the best mode of practicing the invention known to the inventors but is not intended to be limiting in interpretation of the scope of the claims.

Figure 1:
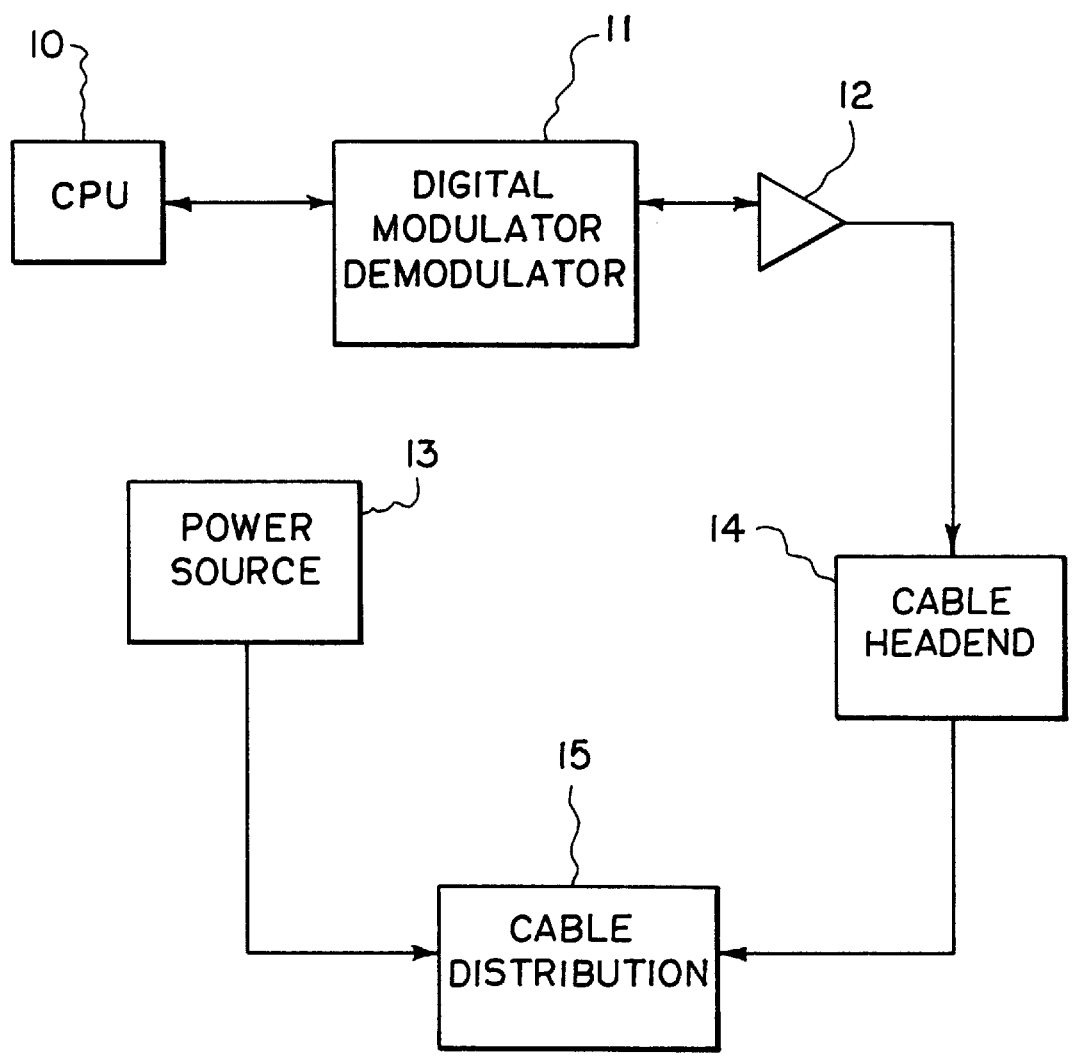
FIG. 1 is a block diagram illustrating the interconnection of the computer, transmitter/receiver and power source (not required if unit is built inside of television set) of the addressable unit of the present invention.

A typical transmit or receive system for an addressable television system is illustrated in block diagram in FIG. 1. The present invention is intended to control an internal mechanism for controlling channel access to a television set. By "internal mechanism" it is meant that this invention pertains to specially manufactured televisions which have an internal tuning mechanism for accessing special rental modes, for example PAY1, PAY2, etc. as described in the Background of the Invention. The system comprises computer 10 which accesses addressable units shown in FIGS. 2 and 3. Digital modulator/demodulator 11 and amplifier 12 communicate with the units. Power source 13 may be an external source, a source from within an individual television set, or may be provided via the cable itself.

Figure 2:
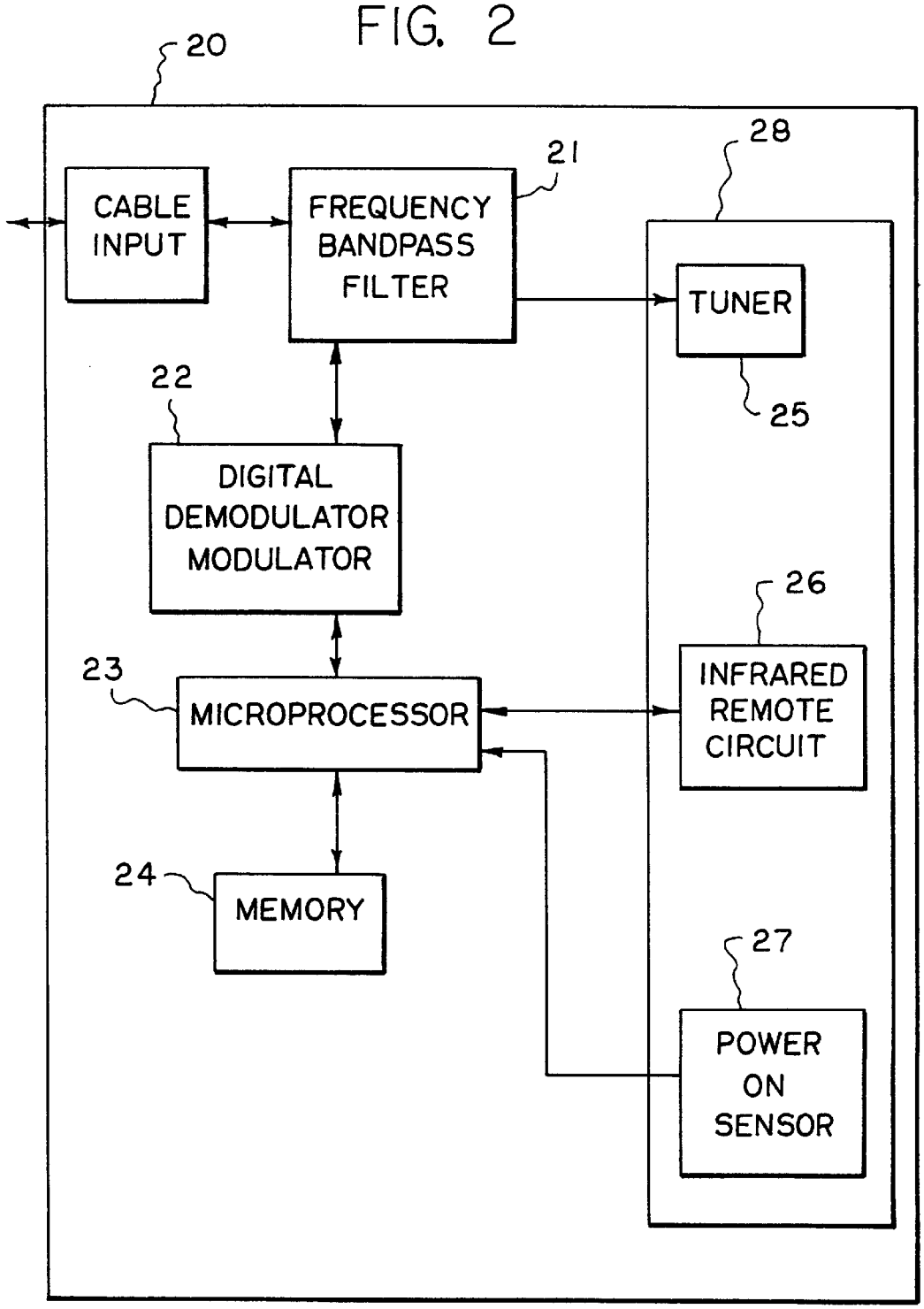
FIG. 2 is a block diagram of an addressable unit embodiment of the present invention incorporated within a manufacturer's television set.

FIG. 2 is a block diagram illustrating an embodiment of the invention where the receiver or transmitter is located inside television set 20. Band pass filter 21 separates the cable channels and passes those signals to the television set tuners. The filtered band pass signal is also sent to digital modulator/demodulator 22 strips the RF signal and processes digital control signals to and from microprocessor 23. Memory 24 stores a particular television address and a program (illustrated in FIG. 4) to run when accessed. Microprocessor 23 also controls the television set's electrical circuit 28. Power-on sensor 27 is in communication with the microprocessor. The sensor informs the microprocessor as to whether the set is on or off. If the set is on, the microprocessor will send control signals to the set to change the desired rental mode (PAY11, PAY2, etc.) of the set. If the set is off, the microprocessor will send control signals to the set to activate the set prior to sending the rental mode control signals.

Figure 3:
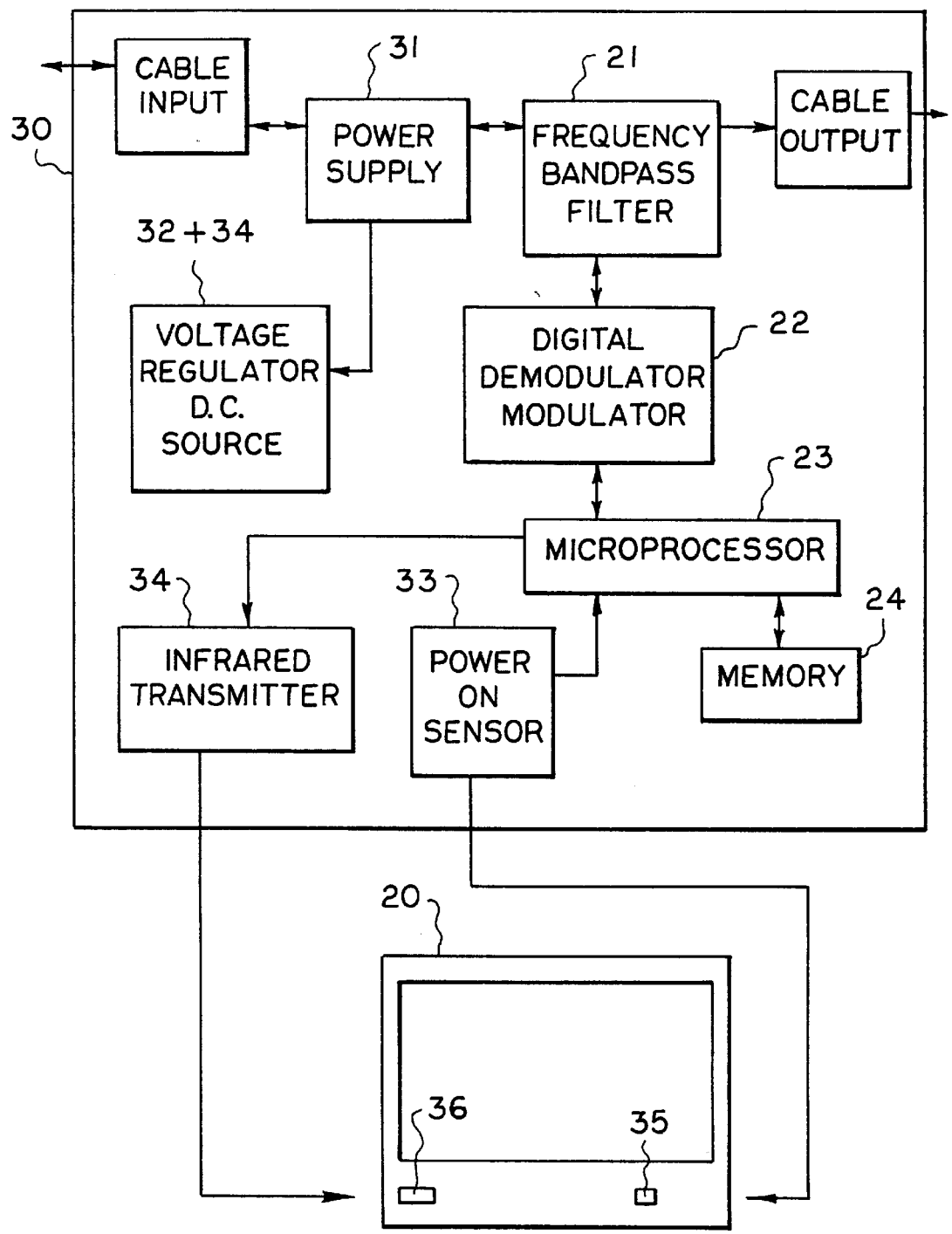
FIG. 3 is a block diagram of an addressable unit of the present invention located externally to a manufacturer's television set.

FIG. 3 illustrates an embodiment of the invention where receiver or transmitter unit 30 is located outside of the television set. Power source 31 is used in conjunction with voltage regulator 32 to supply a voltage and current to the unit via the coax cable line. Frequency band filter 21 is used with digital modulator/demodulator 22 to send data to and from microprocessor 23. Memory 24 stores the address and programming code of microprocessor 23 for a particular set. Power-on sensor 33 and infrared transmitter 34 are used to communicate between television 20 and microprocessor 23.

FIG. 3 also illustrates the external communication between microprocessor 23 and television set 20. Power-on sensor 33 can function in various ways; it can sense, for example, the television set power LED 35 or it can sense the electromagnetic field (EMF). Infrared transmitter 34 communicates, for example, with the television set's infrared sensor 36 via a fiber optic cable or by mounting the control unit proximate the infrared sensor.

Operation

In general, the device operates by receiving codes from CPU 10 which are then processed by unit 30 to control the television sets within the system. Control is accomplished by either standard preset manufacturer control codes or by remote infrared control.

In FIG. 1, central computer 10 holds all the addresses of each box or television set in the cable distribution system. The computer matches the address number with a room number to make the system user-friendly. When a specific room number is desired, a serial code is sent to digital modulator/demodulator 11. The modulated signal is amplified by amplifier 12 and sent to cable distribution headend 14 to be distributed through the establishment. If the receiver box is inside the television as shown in FIG. 2, there is no need to supply a voltage source to power microprocessor 23. The power source can be supplied by television set 20. When the receiver box is outside the television as shown in FIG. 3, an A.C. power source is needed and power can be sent through cable distribution system 15 to power the components in the addressable unit. CPU 10 can also receive data from microprocessor 23 through the cable distribution system.

The onboard addressable unit receiver or transmitter unit shown in FIG. 2 can operate as follows: When a digitally modulated address is transmitted from the CPU over the cable distribution system, frequency bandpass filter 21 detects the carrier signal from the CPU. The signal is then digitally demodulated by demodulator 22 and the data is then sent to microprocessor 23. Once the data is in a register within the microprocessor, it is compared to an address code within memory 24. If the code does not match, the microprocessor reverts to a wait state. When the address code matches a code stored in memory, the microprocessor will execute a program. The microprocessor first senses if the television is "on" or "off". If it is "off", a remote infrared code is sent from the microprocessor and memory to turn the television set "on". Once the television set is "on", the microprocessor sends appropriate manufacturer's preset control codes to set the television to the rental mode desired by the user. The desired modes depend on the establishment and how their cable channels are offered. Microprocessor 23 can also send data regarding rental status back to CPU 10.

The receiver or transmitter section illustrated in FIG. 3 (located external to the set) can operate as follows: The cable input from cable distribution system 15 communicates with addressable unit 30. The unit can draw power from the coax cable itself The power is then sent to voltage regulator 32 to power the components in the unit. The unit uses frequency bandpass filter 21 to remove the address code sent by the CPU which are then demodulated and the digital signal is then sent to the microprocessor. The cable channels are passed through the unit to the television set. The microprocessor then determines if the address code matches the code stored in memory. Each unit has a unique address code for that set. If the address code is matched the microprocessor will then execute a program to control the television set with remote infrared control codes stored in the memory. The microprocessor will first check the power on sensor. If the television is "off" it will send a remote infrared code to turn the television "on". When the television set is "on", the microprocessor will then use remote infrared codes to toggle the mode to the desired television service (e.g., PAY1, PAY2, etc.). Microprocessor 23 can also send data to CPU 10.

FIG. 3 also shows the control of the television set. As shown in the drawing, power-on sensor 33 is in communication with microprocessor 23. The sensor senses the power status of the set in any number of ways. For example, a fiber optic cable attached to power LED 35 of the television senses if there is light or no light. Another way to sense power status is to sense the EMF of the television set. The microprocessor also stores manufacturer's control codes in memory. These codes can be sent directly to infrared sensor 36 via fiber optic or the box can be located proximate the infrared sensor and transmitted via infrared signal. These are but a few of the known ways to send the codes.

Figure 4:
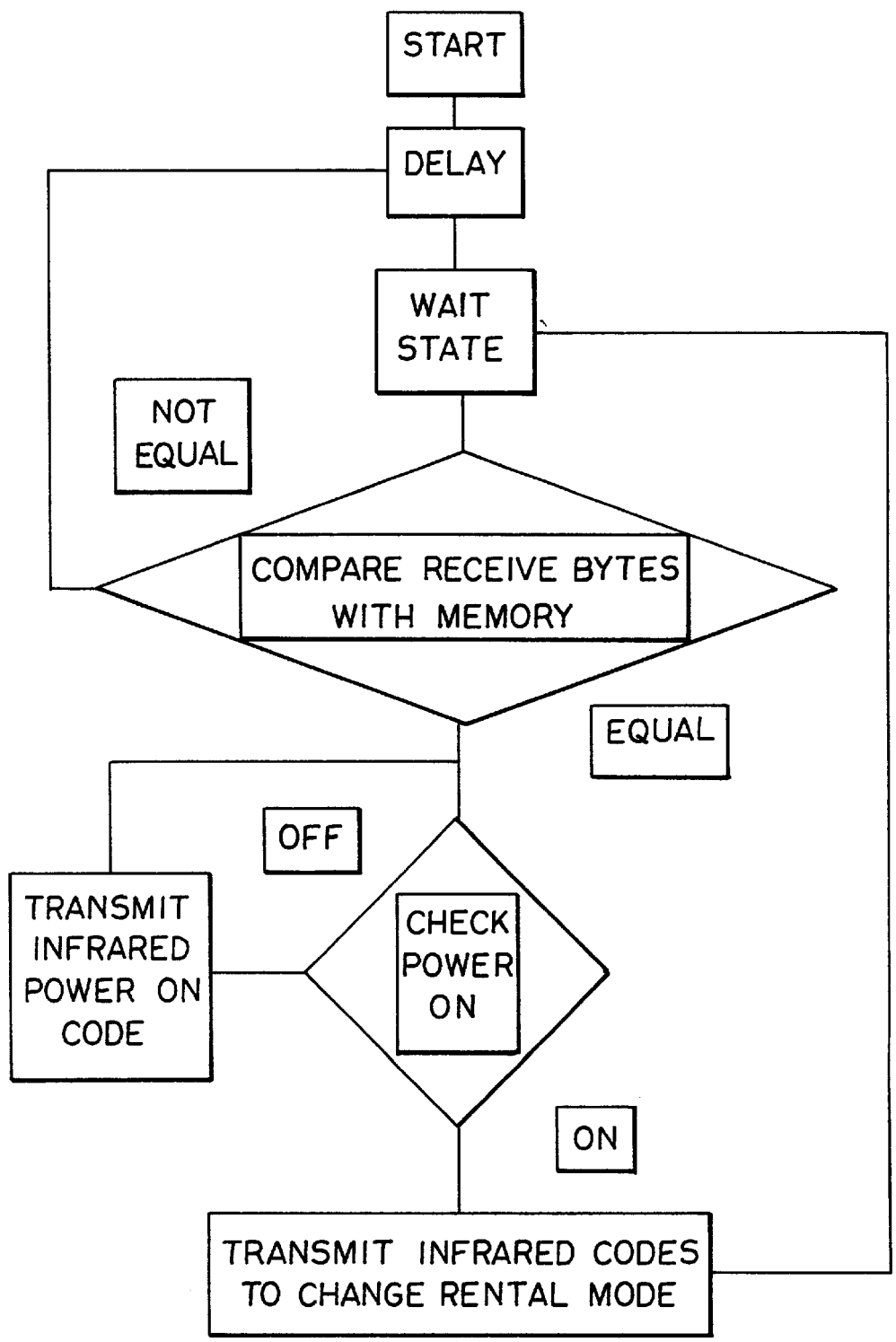
FIG. 4 is a flow chart of the basic microprocessor program which operates a preferred embodiment of the present invention.

In the system of the invention, there are, of course, a plurality of units, each of which has its own microprocessor. FIG. 4 illustrates the flow chart of the basic program implemented by each microprocessor in a preferred embodiment of the invention. Once the program starts, the delay loop is used to keep unaddressed microprocessors occupied while the addressed microprocessor is executing its program. Each microprocessor compares the received codes with a unique identity code stored in its memory. If the received code does not match the stored code, the program enters a delay loop. If the code is matched, the microprocessor checks to see if the television set is "on". If the television set is "off" the microprocessor will transmit the control code (either directly or by infrared, for example) to turn the power "on". Then the microprocessor transmits appropriate codes to change the rental service mode of the television. The microprocessor then returns to a wait-for-transmit state. It should be appreciated that, although in the above-described embodiment, the delay state occurs in the receiving unit, the system could easily be designed such that the delay is incorporated in the transmitting section of the system.

Accordingly, the reader will see that the control of the television set with remote infrared codes from a CPU is a way of addressing the television set directly. Every function of the television can be controlled by a CPU including the rent modes. Each television set has a unique code that the CPU tracks. The individual working the hospital or hotel can control the entire television system through the CPU via the cable distribution system. In addition, the occupant of the room can call the CPU and directly control their television set rental status. Furthermore, the addressable unit has the additional advantages in that:

Although the above description above contained many specificities, these should not be construed as limiting the scope of the invention. The addressable unit can also act as a transmit system. Sending data both ways to the CPU, this allows direct interface between the occupant of the room and the television set.

The following reference numbers are used in the specification and are reprinted herebelow for ease in understanding the invention:

10 Central Processing Unit
11 Digital Modulator / Demodulator
12 RF Amplifier
13 Power Source
14 Cable Television Headend
15 Cable Distribution System
20 Commercial Television Set (Hospital and Hotel Models)
21 Frequency Band Strip
22 Digital Modulator / Demodulator
23 Microprocessor
24 Memory
25 Television Tuner
26 Infrared Remote Circuit (Television)
27 Television Power On Sensor
28 Television Circuit Board
30 Addressable Unit
31 Power supply
32 Voltage Regulator (D.C. source)
33 Power On Sensor
34 Infrared Transmitter
35 Television Power LED
36 Television Infrared Sensor Thus, it is seen that the objects of the invention are efficiently attained by the present invention. The foregoing written description is intended to illustrate the best mode of the invention in a manner that will enable those having ordinary skill in the art to make and use the invention, but is not intended to limit the scope of the following claims.

What is claimed is:

1. An apparatus for controlling a plurality of television sets in a cable distribution network, wherein each of said plurality of television sets contains an internal mechanism for controlling channel access to said television set, comprising:

a plurality of television addressable units, where each of said units controls a single television set, and each of said television addressable units has a demodulator and a microprocessor and associated memory operatively arranged to control said internal mechanism of said television set;

a radio frequency transmitter operatively arranged to transmit a modulated radio frequency signal across said cable distribution network; and, a central processing unit operatively arranged to communicate with said plurality of television addressable units by generating control codes which are carried throughout said cable distribution network by said modulated radio frequency signal, wherein said control codes contain addressability information which enables said television addressable units to control said internal mechanisms of said television sets, and wherein said demodulator is operatively arranged to demodulate said modulated radio frequency signal, wherein all communications within said apparatus travel from said central processing unit to said plurality of television addressable units in one direction only.

* * * * *